Nov. 24, 1953
A. STODDARD
2,660,460
TIE ROD LOCK
Filed Jan. 24, 1951
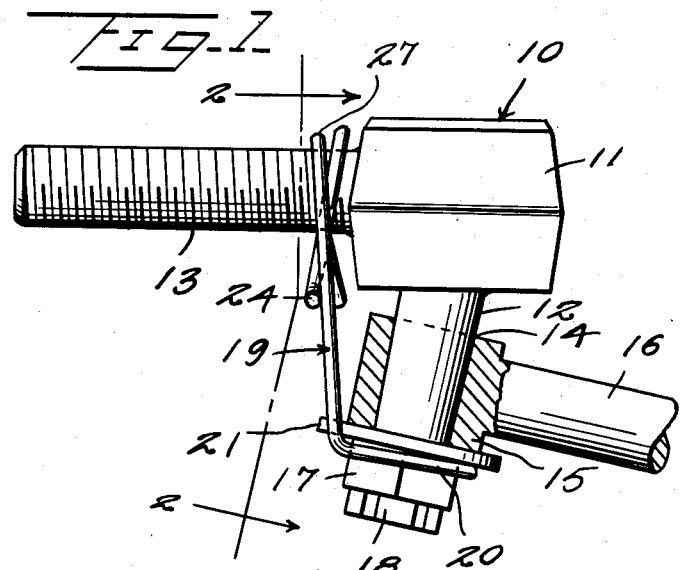
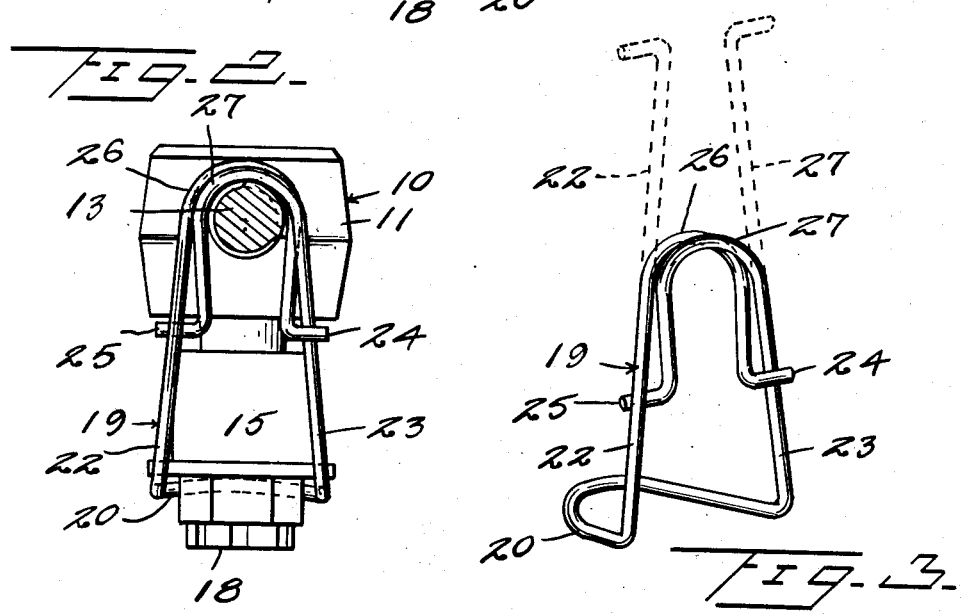
INVENTOR
Alexander Stoddard
BY Kimmel & Crowell
ATTORNEYS Patented Nov. 24, 1953

2,660,460

UNITED STATES PATENT OFFICE 2,660,460

TIE ROD LOCK

Alexander Stoddard, Auburn, Maine, assignor to John G. Marshall, Auburn, Maine

Application January 24, 1951, Serial No. 207,535

1 Claim. (Cl. 287—90)

This invention relates to a safety lock for tie rods.

In the securing of tie rods onto the steering mechanism of a vehicle, the tie rod is secured to a stud having a ball head seated in a ball socket, and the adjacent end of the tie rod is secured to the stud by means of nut and locknut. However, it frequently happens that the locknut is jarred loose and the tie rod becomes disconnected from the stud with resulting damage to the vehicle and possible injury to the driver and passenger. It is, therefore, an object of this invention to provide a safety means which will hold the tie rod from disengagement from the stud irrespective of whether or not the holding nut and locknut are in place.

Another object of this invention is to provide a safety means for a tie rod which can be readily applied and will not affect the normal operation of the steering mechanism.

A further object of this invention is to provide a safety device of this kind which is formed out of resilient material so as to permit relative normal movement of the joint elements.

With the above and other objects in view, my invention consists in the arrangement, combination and details of construction disclosed in the drawings and specification, and then more particularly pointed out in the appended claim.

In the drawings:

Figure 1 is a detailed side elevation partly broken away and in section of a safety lock for tie rods constructed according to an embodiment of this invention.

Figure 2 is a sectional view taken on the line 2—2 of Figure 1.

Figure 3 is a perspective view of a tie member in locked position and showing in dotted lines the initial configuration of the lock.

Referring to the drawings, the numeral 10 designates generally a tie rod knuckle embodying a ball socket member 11 having a threaded stud 13 projecting therefrom. A ball member 12 is pivotally and rockably mounted in the socket 11 and includes a stud 14 on which one end 15 of tie rod 16 is adapted to be pivotally secured. The bearing end 15 of the tie rod 16 is secured on the stud 14 by means of a nut 17 which is threaded on the stud 14, and the nut 17 is locked by means of a lock nut 18.

The tie rod construction hereinbefore described is a conventional construction, and under constant vibration the lock nut 18 and the nut 17 become loosened so that the bearing 17 of the tie rod drops off of the stud 14. This results in the steerable front wheels of the vehicle becoming disengaged from the steering wheel and steering shaft so that the vehicle is uncontrolled and frequently results in more or less serious accidents.

In order to provide a means whereby the bearing 15 of the tie rod 16 will be held against dropping off from the stud 14 irrespective of whether the nuts 17 and 18 are in position on the stud, I have provided a tie rod lock generally designated as 19. The lock 19 is formed from a single length of relatively stiff wire or rod and includes a U-shaped saddle 20 which is adapted to engage beneath a washer 21 which is interposed between the nut 17 and the tie rod bearing 15. The saddle 20 has projecting obtusely therefrom a pair of initially upwardly convergent arms 22 and 23, and the terminal ends of the arms 22 and 23 are formed with right angularly disposed locking extensions 24 and 25, respectively. The arm 22 is adapted to be bent about the knuckle stud 13 as indicated at 26 and then extended downwardly substantially parallel with the arm 23. The locking member 24 which is carried by the arm 22 is then disposed in contacting relation with one side of the arm 23 as shown in Figure 3.

The arm 23 is also bent downwardly as indicated at 27 over the knuckle stud 13 being positioned on the outer side of the loop 26, and the arm 23 is then extended downwardly substantially parallel with arm 22, and the locking extension 25 is disposed on the inner side of arm 22 oppositely from the locking member 24. In other words, the locking member 24 will be disposed on the outer side of the arm 23 and the locking member 25 on the inner side of arm 22 so that excessive strain on arms 22 and 23 will not result in the release of the device.

In the application of this safety lock, after the nuts 17 and 18 have been threaded onto the stud 14 with the washer 21 in position, the saddle 20 is extended beneath the washer 21 and the arms 22 and 23 are extended upwardly on opposite sides of the knuckle stud 13. The two arms 22 and 23 are then bent downwardly about the stud 13 and the locking members 24 and 25 extend on the outer and inner sides respectively of the arms 23 and 22. The inherent resiliency of the safety member 19 will permit the normal rocking of the ball stud 14 relative to the knuckle 10, but in the event the nuts 17 and 18 should become unthreaded and drop from the stud 14 the bearing 15 of tie rod 16 will be held about the stud 14 by means of the U-shaped saddle member 20. This safety lock will prevent any accidents which are caused from uncoupling of the tie rod with the steering knuckle and can be applied without any change in the details of construction of the steering knuckle or the tie rod assembly.

What is claimed is:

In combination, a steering knuckle formed of a ball socket with a stud extending therefrom and a ball in the socket, a tie rod stud extending from the ball, a tie rod, a safety attachment holding the tie rod against disengagement from the tie rod stud, said attachment comprising a resilient U-shaped saddle engaged about the tie rod stud and beneath the tie rod, a pair of angularly disposed projecting resilient arms extending from the ends of said saddle, arcuate members extending toward each other from the ends of said arms carried by said arms engaged about said first named stud, and outwardly projecting locking members carried by the ends of said arcuate members each disposed on an opposite side of one of said arms to interlock said arms and said members about said stud extending from said socket.

ALEXANDER STODDARD.

References Cited in the file of this patent

UNITED STATES PATENTS

| Number | Name | Date |
| --- | --- | --- |
| 1,294,617 | Cartisser | Feb. 18, 1819 |
| 1,330,285 | Shondell | Feb. 10, 1920 |
| 1,383,895 | Withrow | July 5, 1921 |
| 1,519,046 | Pewther | Dec. 9, 1924 |
| 2,456,793 | Reed | Dec. 21, 1948 |
| 2,474,959 | Rieves | July 5, 1949 |
| 2,483,621 | Burnett | Oct. 4, 1949 |
| 2,523,321 | Nelson | Sept. 26, 1950 |